(12) United States Patent
Golaghazadeh et al.

(10) Patent No.: US 12,056,220 B2
(45) Date of Patent: Aug. 6, 2024

(54) EMBEDDING CONCEALED META-DATA INTO DEEP NEURAL NETWORKS (DNNS)

(71) Applicant: Ciena Corporation, Hanover, MD (US)

(72) Inventors: Firouzeh Golaghazadeh, Ottawa (CA); Petar Djukic, Ottawa (CA)

(73) Assignee: Ciena Corporation, Hanover, MD (US)

(*) Notice: Subject to any disclaimer, the term of this patent is extended or adjusted under 35 U.S.C. 154(b) by 220 days.

(21) Appl. No.: 17/893,648

(22) Filed: Aug. 23, 2022

(65) Prior Publication Data
US 2024/0070238 A1 Feb. 29, 2024

(51) Int. Cl.
G06F 21/16 (2013.01)
G06N 3/10 (2006.01)

(52) U.S. Cl.
CPC .............. G06F 21/16 (2013.01); G06N 3/10 (2013.01)

(58) Field of Classification Search
CPC ................................. G06F 21/16; G06N 3/10
See application file for complete search history.

(56) References Cited

U.S. PATENT DOCUMENTS

| | | | |
|---|---|---|---|
| 8,887,217 B2 | 11/2014 | Salem et al. | |
| 9,060,292 B2 | 6/2015 | Callard et al. | |
| 9,461,729 B2 | 10/2016 | Djukic et al. | |
| 9,819,565 B2 | 11/2017 | Djukic et al. | |
| 10,015,057 B2 | 7/2018 | Djukic et al. | |
| 10,148,578 B2 | 12/2018 | Morris et al. | |
| 10,448,425 B2 | 10/2019 | Au et al. | |
| 10,491,501 B2 | 11/2019 | Armolavicius et al. | |
| 10,623,277 B2 | 4/2020 | Djukic et al. | |
| 11,057,495 B2 | 7/2021 | Fedorov et al. | |
| 11,063,694 B2 | 7/2021 | Coulombe et al. | |
| 11,153,229 B2 | 10/2021 | Djukic et al. | |
| 11,316,755 B2 | 4/2022 | Djukic et al. | |
| 11,356,174 B1 | 6/2022 | Golaghazadeh et al. | |
| 11,356,320 B2 | 6/2022 | Côté et al. | |
| 11,363,031 B2 | 6/2022 | Carnes, III et al. | |
| 2014/0229210 A1 | 8/2014 | Sharifian et al. | |
| 2017/0206449 A1* | 7/2017 | Lain | G06N 3/02 |
| 2017/0214467 A1 | 7/2017 | Djukic et al. | |
| 2019/0379589 A1 | 12/2019 | Ryan et al. | |
| 2021/0089927 A9 | 3/2021 | Ryan et al. | |
| 2021/0150305 A1 | 5/2021 | Amiri et al. | |
| 2021/0256978 A1* | 8/2021 | Jin | G06N 3/045 |
| 2021/0303969 A1 | 9/2021 | Amiri et al. | |
| 2022/0237729 A1* | 7/2022 | Wang | G06N 3/08 |
| 2022/0343026 A1* | 10/2022 | Yang | G06T 1/0092 |

(Continued)

FOREIGN PATENT DOCUMENTS

EP 2 929 744 B1 4/2019

*Primary Examiner* — Raqiul A Choudhury
(74) *Attorney, Agent, or Firm* — Clements Bernard Walker; Christopher L. Bernard

(57) ABSTRACT

The present disclosure relates to systems and methods for embedding concealed meta-data into DNNs. Specifically, the system and method presented consists of receiving a trained neural network that includes one or more layers each having weights. The disclosed process includes transforming at least one layer to a transformed domain, adding information to the layer(s) in the transformed domain, and performing an inverse domain transform on at least one layer such that the layer(s) has new weights with an embedded watermark.

17 Claims, 5 Drawing Sheets

(56) References Cited

U.S. PATENT DOCUMENTS

| | | | | |
|---|---|---|---|---|
| 2023/0145544 A1* | 5/2023 | Sternby | ................... | G06N 3/08 |
| | | | | 713/176 |
| 2023/0325497 A1* | 10/2023 | Kumar | ................... | G06F 21/64 |
| | | | | 726/23 |

* cited by examiner

EMBEDDING CONCEALED META-DATA INTO DEEP NEURAL NETWORKS (DNNS)

FIELD OF THE DISCLOSURE

The present disclosure generally relates to networking systems and methods. More particularly, the present disclosure relates to receiving a trained neural network and embedding concealed meta-data into those neural networks.

BACKGROUND OF THE DISCLOSURE

Machine learning is the scientific study of computer algorithms that can improve without using explicit instructions, through experience and by the use of data. Machine learning is a sub-set of artificial intelligence (AI) and creates and uses models based on sample data, otherwise called training data, to make predictions and decisions automatically. Deep learning describes methods of machine learning based on artificial neural networks with representation learning, this method learns and improves on its own by examining computer algorithms. Deep learning architectures such as Deep Neural Networks (DNNs) can model complex non-linear relationships and can generate compositional models where the object is expressed as a layered composition of primitive data types. Neural networks such as DNN comprise of layers of nodes, much like the human brain is made up of neurons, these nodes within individual layers are connected to adjacent layers, and the term "deep" refers to the number of layers through which the data is transformed.

Deep neural networks are becoming an important technology in the networking space. Applications include forecasting, pattern detection in State of Polarization (SoP) and Optical Time-Domain Reflectometer (OTDR) measurements, prediction of failures, etc. The introduction of this new technology requires that intellectual property (IP) contained in trained models be tracked and protected from theft. Trained models can be seen as intellectual property for their creators and as such, the model licenses need to be protected. Digital watermarks are digital code embedded into digital content that is used to identify ownership of the content. Digital watermarks can consist of different methods, techniques, and steps that serve to help to provide the copyright protection.

It should be clear that training models are an expensive endeavor both in terms of human capital as well as actual capital of computations. For example, one popular model cost $12M for a single training run (see, e.g., Shaabana, Ala, "The Future of AI is Decentralized", Feb. 27, 2021, available online at towardsdatascience.com/the-future-of-ai-is-decentralized-848d4931a29a, the contents of which are incorporated by reference. While not quite as expensive, in our experience, a typical model can currently costs $50,000-$150,000 to produce.

While the trained models are expensive, they are also difficult to track. Typically, a model may be stored in an Open Neural Network Exchange (ONNX) file format, which saves the matrices used in the Deep Neural Network (DNN) and their relationships in a binary form. An ONNX file can be transmitted as a part of a software distribution, by e-mail, or on a Universal Serial Bus (USB) flash drive. This file format is unencrypted and easy to modify (especially identifying meta-data information such as the data source, author, copyright etc.). It is easy to change the possession of the file, without the knowledge of the copyright owner.

Over the last decade, digital watermarks have been widely used to safeguard the ownership of multimedia and video material, as well as functional artifacts like digital integrated circuits. Watermarking strategies for DNNs, on the other hand, are still in their infancy in terms of enabling trustworthy model distribution. Furthermore, adding digital watermarks puts even more burden on DNN training and execution memory. As a result, efficient resource management to reduce watermarking overhead is a constant problem.

BRIEF SUMMARY OF THE DISCLOSURE

The present disclosure generally relates to networking systems and methods. More particularly, the disclosure details processes that embed concealed meta-data into the weights of the model, which can be used to identify the source of the model, data used to train the model, copyright owner of the model, etc. Unlike existing methods, which embed the watermark during the training phase, the proposed allows any meta-data to be embedded after training. For instance, if someone desires to embed extra information into the model, they do not need to go through the entire costly training process again. This embedding process is more flexible than existing processes.

In an various embodiments, the present disclosure includes a method having steps, a system with one or more processors configured to implement the steps, and a non-transitory computer-readable medium with instructions that, when executed, cause one or more processors to perform the steps. The steps include receiving a trained neural network that includes one or more layers each having weights; transforming at least one layer of the one or more layers to a transformed domain; adding information to the at least one layer in the transformed domain; and performing an inverse domain transform on the at least one layer such that the at least one layer has new weights with an embedded watermark. The steps can further include receiving a second trained neural network and determining whether it is the trained neural network based on extracting the embedded watermark. The transforming can include sorting the weights in the at least one layer; and performing a domain transfer on the sorted weight. The sorting can be one of by magnitude and random.

The transforming can include utilizing one of a Discrete Fourier Transform (DFT), a Discrete Cosine Transform (DCT), and a Windowed Fourier Transform (WFT). The transforming can include utilizing a channel code including any of convolutional, Low-Density Parity-Check (LDPC), polar, and turbo codes. The trained neural network can be in an Open Neural Network Exchange (ONNX) file format. The new weights are different from the weights and have negligible impact on performance of the trained neural network.

BRIEF DESCRIPTION OF THE DRAWINGS

The present disclosure is illustrated and described herein with reference to the various drawings, in which like reference numbers are used to denote like system components/process steps, as appropriate, and in which.

DETAILED DESCRIPTION OF THE DISCLOSURE

Figure 1:
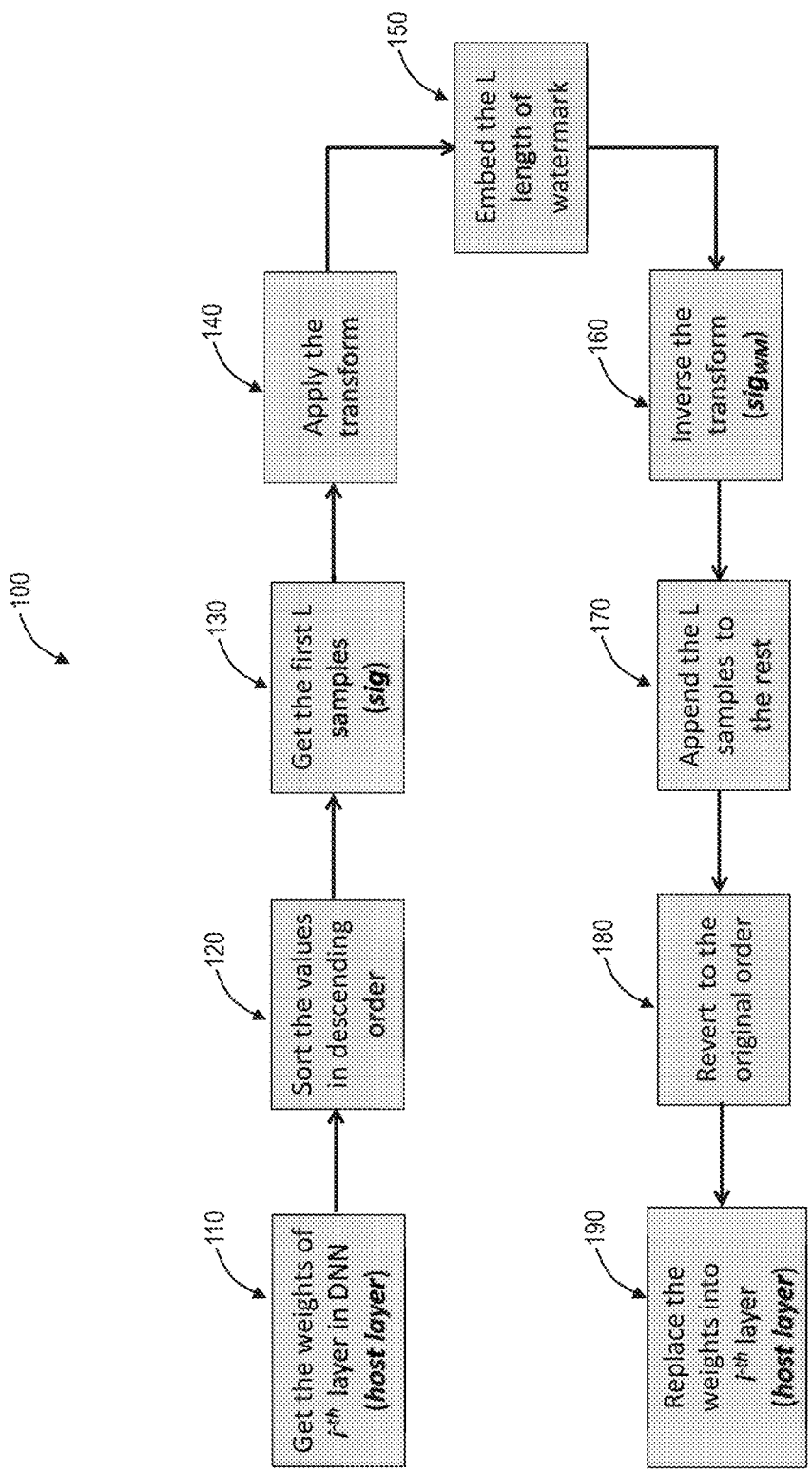
FIG. 1 is a block diagram depicting the watermark embedding process in a hidden layer of DNN.

In various embodiments, the present disclosure relates to systems and methods for embedding concealed meta-data into DNNs. More particularly, the disclosure details processes that embed concealed meta-data into the weights of the model, which can be used to identify the source of the model, data used to train the model, copyright owner of the model, etc. Unlike existing methods, which embed the watermark during the training phase, the proposed allows any meta-data to be embedded after training. For instance, if someone desires to embed extra information into the model, they do not need to go through the entire costly training process again. This embedding process is more flexible than existing processes.

Digital Steganography and Watermarking

Steganography is the practice of concealing a message within another message or object. In the digital/computing context a computer file, message, image, or video is concealed within another file, message, image, or video. In digital steganography, electronic communications may include steganographic coding inside of a transport layer, such as a document file, image file, program, or protocol. Where digital steganography consists of concealing data within another object, watermarking is used to verify the identity and authenticity of the owner of a digital image and is used for holding copyrights for the data.

Embedding of digital watermarking is a known method to protect intellectual assets. It has been recognized that training an effective DNN can be very expensive. As OpenAI published, the cost of training Generative Pre-trained Transformer 3 (GPT-3), a Natural Language Processing (NLP) benchmarks with 175 billion parameters, was estimated around $12 million (see, e.g., Kyle Wiggers. "OpenAI's massive GPT-3 model is impressive, but size isn't everything" (2020). Available online at venturebeat.com/2020/06/01/ai-machine-learning-openai-gpt-3-size-isnt-everything, the contents of which are incorporated by reference in their entirety. Therefore, it is important to treat trained models as an intellectual property and prevent intellectual property infringement. The way that OpenAI does this is by hiding a model behind a Representational State Transfer (REST) Application Programming Interface (API). This method is not possible in networking situations, where the model should be present on the customer premise for latency reasons.

Even though watermarking has been widely used in multimedia ownership protection, it is still challenging to be effectively embedded in a DNN. One of the first work in this area suggested a generic approach for inserting a watermark into the weights by adding an embedding regularized parameter to the original cost function (a cost function is used to measure how accurate the model performed or the difference between the predicted value and the actual value). The method embeds the watermark while it trains (see, e.g., Nagai, Y., Uchida, Y., Sakazawa, S., & Satoh, S. I. (2018). Digital watermarking for deep neural networks. International Journal of Multimedia Information Retrieval, 7(1), 3-16, and Uchida, Y., Nagai, Y., Sakazawa, S., & Satoh, S. I. (2017, June). Embedding watermarks into deep neural networks. In Proceedings of the 2017 ACM on International Conference on Multimedia Retrieval (pp. 269-277), the contents of each are incorporated by reference in their entirety. DeepSigns is a watermarking framework that embeds the watermark into the Probability Density Function (pdf) of the activation maps obtained in various layers of a DNN model. Unlike previous studies that directly embed the watermark information in the static content (weights), DeepSigns encodes the watermark information in the dynamic content of the DNN and can only be activated by giving certain input data to the model (see, e.g., Rouhani, B. D., Chen, H., & Koushanfar, F. (2019). Deepsigns: an end-to-end watermarking framework for protecting the ownership of deep neural networks. In ACM International Conference on Architectural Support for Programming Languages and Operating Systems, the contents of which are incorporated by reference in their entirety.

As disclosed herein processes that allow us to embed concealed meta-data into the weights of the model, which can be used to identify the source of the model, data used to train the model, copyright owner of the model, etc. The methods are meant to be used in the networking application, so when a model is trained, the watermark is embedded in the model, and then the model is deployed on customer premises. The owner can then check if a model used in production is produced by the owner. The watermark can also be used to ensure that only the owner models run in authorized Artificial Intelligence (AI) solutions, ensuring that warranty terms are respected. This method can be used beyond the owner in any situation where a DNN model needs to be tracked or verified. The application can be any organization that uses DNN models.

The major limitation of the existing industry watermarking methods is that the watermarking signature is embedded during the training process. This can be very expensive if even the owner decides to modify the watermarked messages. For instance, adding a longer message requires the model to be re-trained. Moreover, the sorting step in the disclosed is an effective way to combat the pruning attack, even with a small pruning rate, they would not be able to perfectly recover the watermark messages. A pruning attack against a DNN watermark refers to when less important neurons in the model are pruned to make it more compact and allowing the removal of the watermark from the DNN.

For the watermarking method to be useful it needs to satisfy the following:

The watermark embedding process does not affect the performance of the model.

Reasonable modifications on the model (that do not affect the performance) should not remove the message from the model.

As disclosed herein the proposed processes satisfy both requirements. In addition, it is useful that the watermark is concealed in the DNN and embeds meta-data into the weights of the DNN after it has been trained. The proposed methods allow any meta-data to be embedded after the training. For instance, if someone wants to embed extra information into the model, they don't have to go through the entire costly training process again. Therefore, the embedding process here is more flexible than any known industry processes. Throughout this disclosure the terms watermark, meta-data, and message are used interchangeably.

Embedding a Message in DNN Weights

Weight is the parameter within a DNN that transforms input data within the networks hidden layers. The weight decides how much influence the input will have on the output. A DNN based machine learning (ML) algorithm, through its training process, tries to find a function (i.e., the parameter θ) that best maps its inputs ($x_i$) to its corresponding target values ($y_i$) as expressed in Equation 1:

$$\hat{y}_i = f(\theta, x_i), \text{ and } |\hat{y}_i - y_i| < \epsilon \quad \text{(Equation 1)}$$

where, $\hat{y}_i$ is the predicted target value.

The method of watermark embedding herein is defined as inserting an L-bit watermark or meta-data into the weights of one or more layers of a trained neural network. We call the meta-data message (M). The message is embedded in a way that does not interfere with the performance of the DNN.

The model with the embedded message is a new function approximation:

$$\tilde{y}_i = f(\theta_{WM}, x_i), \text{ and } |\tilde{y}_i - y_i| < \epsilon \quad \text{(Equation 2)}$$

where, $\theta_{WM}$ are the weights with embedded watermark, and $\tilde{y}_i$ is the prediction of the model with those weights.

The embedding process defines g( ), which produces new weights including the message:

$$\theta_{WM} = g(\theta, \alpha, M) \quad \text{(Equation 3)}$$

where, M is the L-bit inserted message.

To be useful, function g( ) should satisfy the following:
 1. It is required to satisfy the error measurement as shown in Equation 2.
 2. It should be an invertible function because of the extraction process of the watermark.
 3. The embedded watermark should be robust against model compression and model modifications (such as fine tuning).

Embedding Procedure

The general framework for embedding a watermark is shown in FIG. 1, which shows the preferred method of embedding, however alternative methods are also possible.

The message is embedded after training is complete and is added into one or more layers. As an example, the $i^{th}$ hidden layer of a trained network, given the term host layer, can be the location of the concealed message 110. The weights of the host layer are sorted in some fashion 120. For example, we show herein that the descending order is a good choice, but in general a mapping (shuffling) function known to the author only could be used to encrypt the message.

After sorting the weights of the host layer, a vector of L top values of the sorted weights (named as sig) 130 is created. Then, the sig is transformed to the wavelet domain 140 for embedding the message 150 (see, e.g., Xia, X. G., Boncelet, C. G., & Arce, G. R. (1998). Wavelet transform based watermark for digital images. Optics Express, 3(12), 497-511, the contents of which are incorporated by reference in their entirety). A Discrete Wavelet Transform (DWT) also decomposes sig into two set of wavelet coefficients: the approximation coefficients, cA, (low pass component of a signal) and the detail coefficients (high pass component of a signal), cD:

$$(cA, cD) = \text{dwt}(\text{sig}) \quad \text{(Equation 4)}$$

Since DWT is an invertible process, we can reconstruct the sig exactly as follows:

$$\text{sig}_{rec} = \text{idwt}(cA, cD) \quad \text{(Equation 5)}$$

We embed the M bit watermark into the wavelet's coefficients with:

$$(cA, cD)_{WM} = (cA, cD) + \alpha \times M \quad \text{(Equation 6)}$$

where, α determines the strength of the embedded watermark (the extent to which the DWT coefficients change). It's worth noting that if α is set too high, the watermarked model's performance will deteriorate.

Herein, it has been demonstrated how to embed your watermark in the Wavelet domain, we still need to perform the inverse DWT to generate the sig (the DNN weights) 160:

$$\text{sig}_{WM} = \text{idwt}(cA_{WM}, cD_{WM}) \quad \text{(Equation 7)}$$

The watermark only applied to the L larger values of the weights, sig, earlier in the procedure, the $\text{sig}_{WM}$ obtained from Equation 7 must be appended to the remainder of the weights' values 170, reverted to their original order 180, and lastly substituted in the host layer 190. The procedures are demonstrated in 160 thru 190.

Message Retrieval

Figure 2:
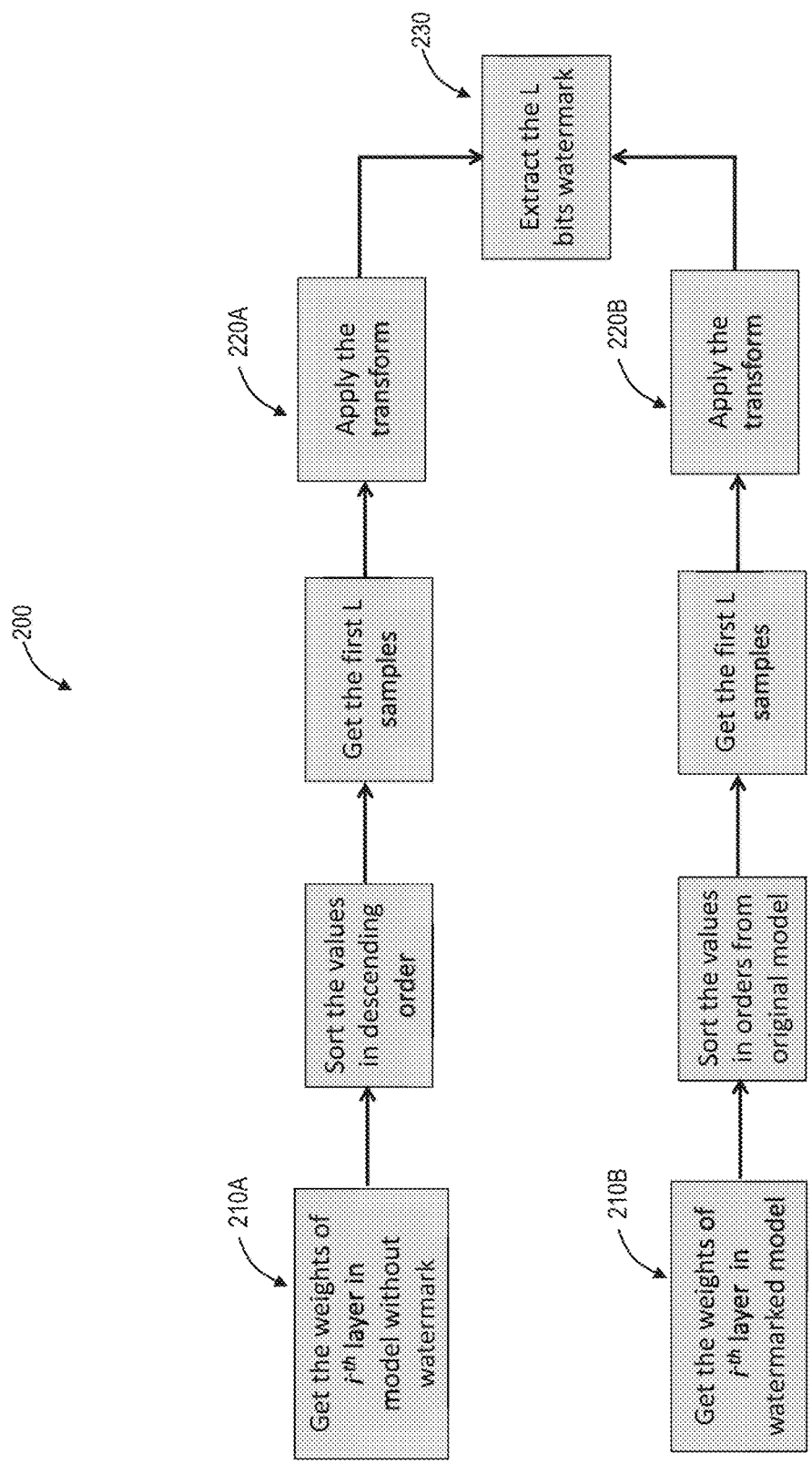
FIG. 2 is a block diagram depicting the process of extracting the embedded watermark.

By having access to the original model (model without the watermark) the concealed message can be extracted, the steps for extracting are shown in FIG. 2. We need to get the weights of the host layer in both models and as explained previously in the disclosed (210A, 210B), and transform them to the wavelet domain (220A,220B) by equation 4. After transforming to the wavelet domain, the watermark is extracted 230 as follows:

$$M = ((cA, cD)_{WM} - (cA, cD))/\alpha \quad \text{(Equation 8)}$$

Although only one level of DWT decomposition is presented in Equation 4, it is possible to perform the DWT numerous times before embedding the watermark. This will improve the security of the message.

Other Embedding Techniques

The described method is not limited to DWT, any invertible transform such as Discrete Fourier Transform (DFT), Discrete Cosine Transform (DCT) (see, e.g., Barni, M., Bartolini, F., Cappellini, V., & Piva, A. (1998). A DCT-domain system for robust image watermarking. Signal processing, 66(3), 357-372, the contents of which are incorporated by reference in their entirety), etc. can be implemented. The watermark insertion technique is not confined to the formula in Equation 6; it can also be done using a linear or exponential formula (see, e.g., Cox, I. J., Kilian, J., Leighton, F. T., & Shamoon, T. (1997). Secure spread spectrum watermarking for multimedia. IEEE transactions on image processing, 6(12), 1673-1687, the contents of which are incorporated by reference in their entirety):

$$(cA, cD)_{WM} = (cA, cD) \times (1 + \alpha \times M)$$

$$(cA, cD)_{WM} = (cA, cD) \times (e^{\alpha M})$$

Robustness and security are used interchangeably and generally refers to the strength of the technique to resist attacks that intend to retrieve or modify the hidden data. The robustness of the technique can also be improved by encoding the L-bit of meta-data information with a channel code (e.g., convolutional, Low-Density Parity-Check (LDPC), polar, or turbo codes).

Robustness to Modification

The methods disclosed have been implemented to test its performance along the two main points of interest:
 Does the water mark diminish the performance of the model.
 Can the watermark be removed.

As previously stated, inserting the message into a model should not impair its performance. To demonstrate the performance of the model is not degraded, a fully connected neural network is trained to classify the handwriting digits of the Modified National Institute of Standards and Technology (MNIST) dataset. A random message is than embedded into one of the hidden layers. The average cross-entropy loss on 10K test samples before and after the watermark is summarized in the table below. As can be observed, the average cross-entropy loss increases slightly as the watermark length increases, although the difference is insignificant at roughly 0.001.

| Watermark length (L) | Original model | Model with watermark ($\alpha = 0.01$) |
| --- | --- | --- |
| 100 | 0.1442 | 0.1444 |
| 200 | 0.1442 | 0.1445 |
| 300 | 0.1442 | 0.1445 |

Figure 3:
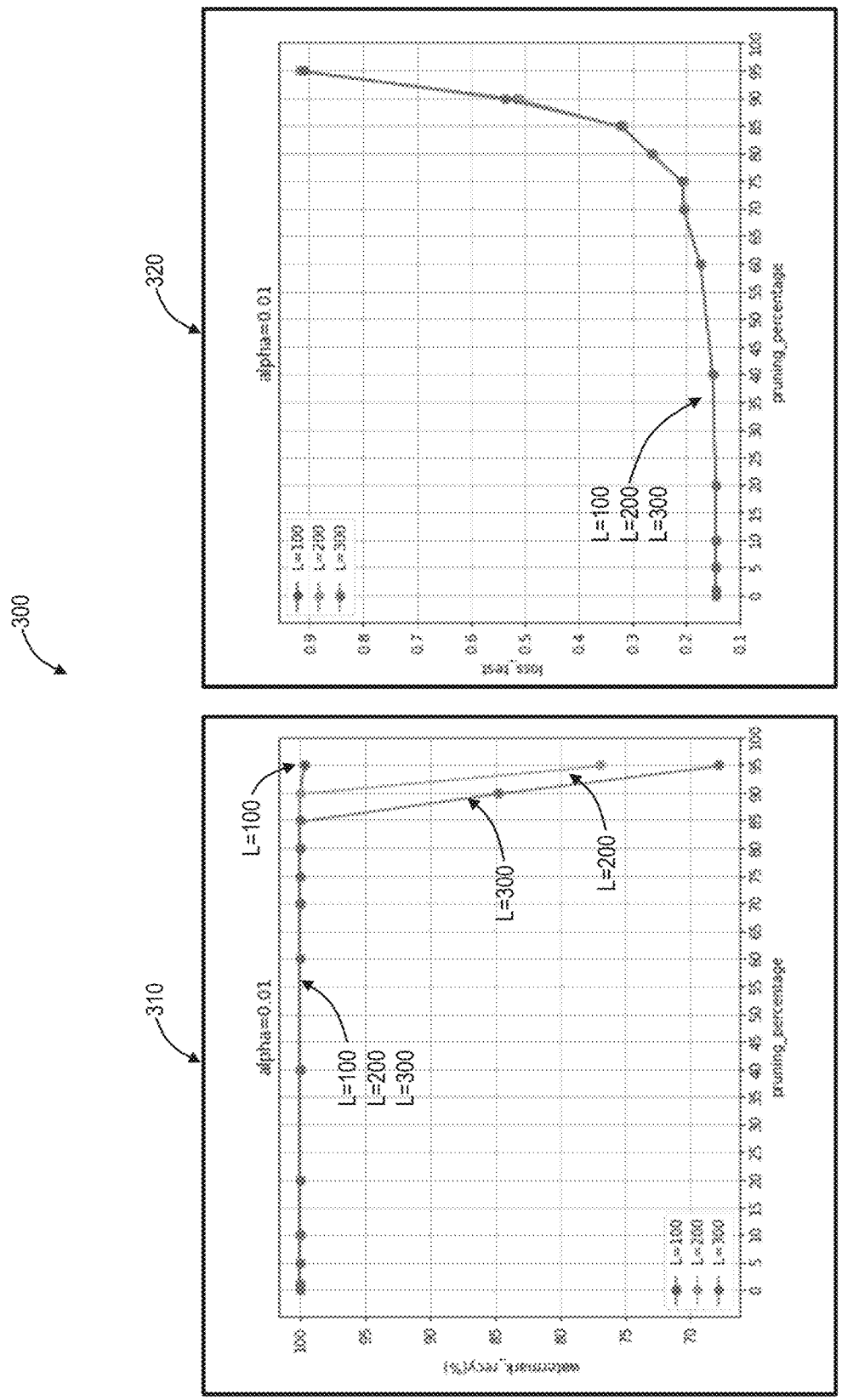
FIG. 3 is a dataset showing robustness of embedding watermark against pruning attack and performance of the model.
Figure 4:
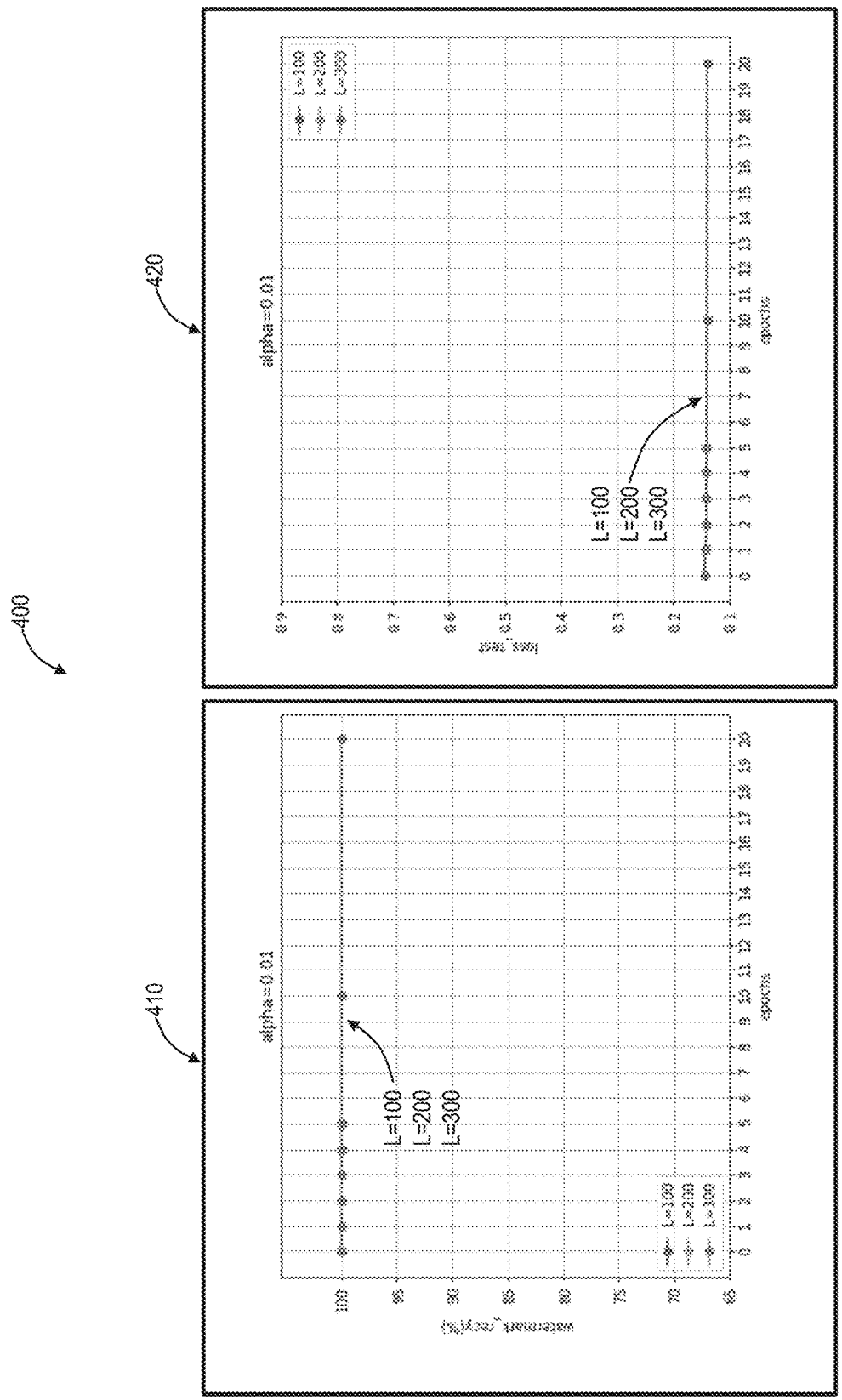
FIG. 4 is a dataset showing robustness of embedding water mark against fine tuning attack and performance of the model.

An effective watermark algorithm should be robust against model modifications. One of the common modifications is known as model compression or weight pruning. During the compression process, the smallest weight values in layers are set to zero. Since we are embedding the watermark in the highest weight values, the proposed approach is robust against the compression attack. This is demonstrated in FIG. 3.

As the pruning rate increases to a very high value, it is possible that some of the highest values of the weight being set to zero. Although in this situation, the watermark cannot be perfectly recovered, the model performance will also drastically degrade (due to the high compression rate). Therefore, there is a tradeoff between model compression rate and its performance. As shown in 300, the proposed method can perfectly detect a watermark message of 200 bits, up to 90% of parameter pruning for the MNIST dataset, as shown in 310. However, the higher pruning rate would dramatically increase the model loss (reduce the performance of the watermarked model). As can be seen in 320, the model can withstand a pruning rate of up to 40%-45%.

The other possible modification is fine tuning, where after training, the model is trained on new data, but not from scratch. This process is also observed in transfer learning. Embedding a strong watermark, considering a bigger value for a in Equation 6, can help to protect the watermark against the fine-tuning attack. 410 shows the results of fine tuning. The information in the watermark is not lost even after 20 training epochs. As shown in 320 the performance of the model improves slightly with the extra iterations.

Figure 5:
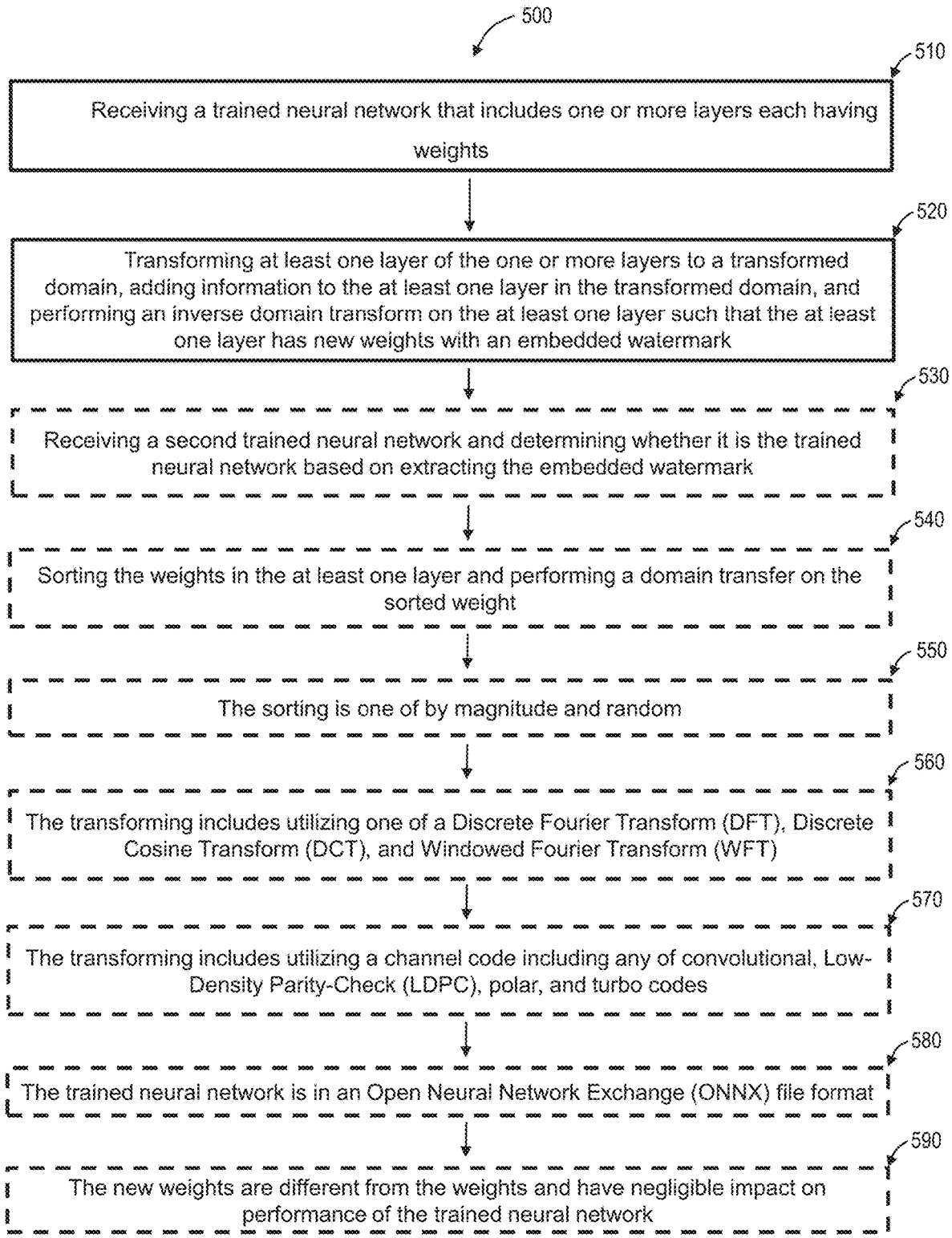
FIG. 5 is a flowchart of the process shown in the claims for embedding concealed meta-data into DNNs.

FIG. 5 shows a flowchart of the methods disclosed wherein a trained neural network that includes one or more layers each having weights is received 510. The disclosed process includes transforming at least one layer to a transformed domain, adding information to the layer(s) in the transformed domain, and performing an inverse domain transform on at least one layer such that the layer(s) has new weights with an embedded watermark (520). The process can also receive a second trained neural network and determine whether it is the trained neural network based on extracting the embedded watermark (530). Moreover, the sorting step which sorts the weights in the layer and performs a domain transfer on the sorted weight is an effective way to combat the pruning attack, even with a small pruning rate, they would not be able to perfectly recover the watermark messages (540). The sorting is one of by magnitude and random (550). The transforming step includes utilizing one of a Discrete Fourier Transform (DFT), Discrete Cosine Transform (DCT), and Windowed Fourier Transform (WFT) (560), and utilizes a channel code including any of convolutional, Low-Density Parity-Check (LDPC), polar, and turbo codes (570). The trained neural network is typically stored in an Open Neural Network Exchange (ONNX) file format (580) which saves matrices used in DNN and their relationships in binary form, and the new weights are different from the weights and have negligible impact on performance of the trained neural network (590).

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause one or more processors to perform steps of:

receiving a trained neural network that includes one or more layers each having weights;

transforming at least one layer of the one or more layers to a transformed domain;

adding information to the at least one layer in the transformed domain;

performing an inverse domain transform on the at least one layer such that the at least one layer has new weights with an embedded watermark; and receiving a second trained neural network and determining whether it is the trained neural network based on extracting the embedded watermark.

2. The non-transitory computer-readable medium of claim 1, wherein the transforming includes sorting the weights in the at least one layer; and performing a domain transfer on the sorted weight.

3. The non-transitory computer-readable medium of claim 2, wherein the sorting is one of by magnitude and random.

4. The non-transitory computer-readable medium of claim 1, wherein the transforming includes utilizing one of a Discrete Fourier Transform (DFT), a Discrete Cosine Transform (DCT), and a Windowed Fourier Transform (WFT).

5. The non-transitory computer-readable medium of claim 1, wherein the transforming includes utilizing a channel code including any of convolutional, Low-Density Parity-Check (LDPC), polar, and turbo codes.

6. The non-transitory computer-readable medium of claim 1, wherein the trained neural network is in an Open Neural Network Exchange (ONNX) file format.

7. The non-transitory computer-readable medium of claim 1, wherein the new weights are different from the weights and do not affect performance of the trained neural network.

8. A method comprising steps of:

receiving a trained neural network that includes one or more layers each having weights;

transforming at least one layer of the one or more layers to a transformed domain;

adding information to the at least one layer in the transformed domain;

performing an inverse domain transform on the at least one layer such that the at least one layer has new weights with an embedded watermark; and receiving a second trained neural network and determining whether it is the trained neural network based on extracting the embedded watermark.

9. The method of claim 8, wherein the transforming includes sorting the weights in the at least one layer; and performing a domain transfer on the sorted weight.

10. The method of claim 9, wherein the sorting is one of by magnitude and random.

11. The method of claim 8, wherein the transforming includes utilizing one of a Discrete Fourier Transform (DFT), a Discrete Cosine Transform (DCT), and a Windowed Fourier Transform (WFT).

12. The method of claim 8, wherein the transforming includes utilizing a channel code including any of convolutional, Low-Density Parity-Check (LDPC), polar, and turbo codes.

13. The method of claim 8, wherein the trained neural network is in an Open Neural Network Exchange (ONNX) file format.

14. The method of claim 8, wherein the new weights are different from the weights and do not affect performance of the trained neural network.

15. A system comprising:

at least one processor and memory comprising instructions that, when executed, cause the at least one processor to receive a trained neural network that includes one or more layers each having weights, transform at least one layer of the one or more layers to a transformed domain;

add information to the at least one layer in the transformed domain, perform an inverse domain transform on the at least one layer such that the at least one layer has new weights with an embedded watermark; and receive a second trained neural network and determine whether it is the trained neural network based on extracting the embedded watermark.

16. The system of claim 15, wherein the at least one layer is transformed by sorting the weights in the at least one layer; and performing a domain transfer on the sorted weight.

17. The system of claim 15, wherein the at least one layer is transformed utilizing one of a Discrete Fourier Transform (DFT), a Discrete Cosine Transform (DCT), and a Windowed Fourier Transform (WFT).

* * * * *